United States Patent [19]

Deeks

[11] Patent Number: 5,113,661
[45] Date of Patent: May 19, 1992

[54] ENERGY STORAGE ARRANGEMENT

[76] Inventor: Daniel H. Deeks, 231 Franklin Ave., Sea Cliff, N.Y. 11579

[21] Appl. No.: 528,039

[22] Filed: May 23, 1990

[51] Int. Cl.⁵ .................................................. F25B 21/00
[52] U.S. Cl. ........................................ 62/3.1; 204/155
[58] Field of Search ............... 62/3.1; 429/10; 372/37; 204/155

[56] References Cited

FOREIGN PATENT DOCUMENTS 2096851 4/1981 United Kingdom .................. 62/3.1

Primary Examiner—Albert J. Makay
Assistant Examiner—John Sollecito
Attorney, Agent, or Firm—Scully, Scott, Murphy & Presser

[57] ABSTRACT

A method and system of energy storage in which energy is stored in the compression of a metastable degenerate Fermi electron gas contained in a compressed metallic material such as hydrogen and/or metallic lithium in a diamond anvil high pressure cell which is subjected to a magnetic field by further compressing the metastable degenerate Fermi electron gas. In operation, heat energy is introduced to increase the energy of the compressed metastable degenerate Fermi electron gas which causes the magnetic field associated therewith to increase to further compress the metastable degenerate Fermi electron gas, which causes the heat to be absorbed and results in a decrease in the temperature thereof. Energy can be withdrawn from the system by allowing the metastable degenerate Fermi electron gas to expand against the compressing magnetic field.

12 Claims, 1 Drawing Sheet

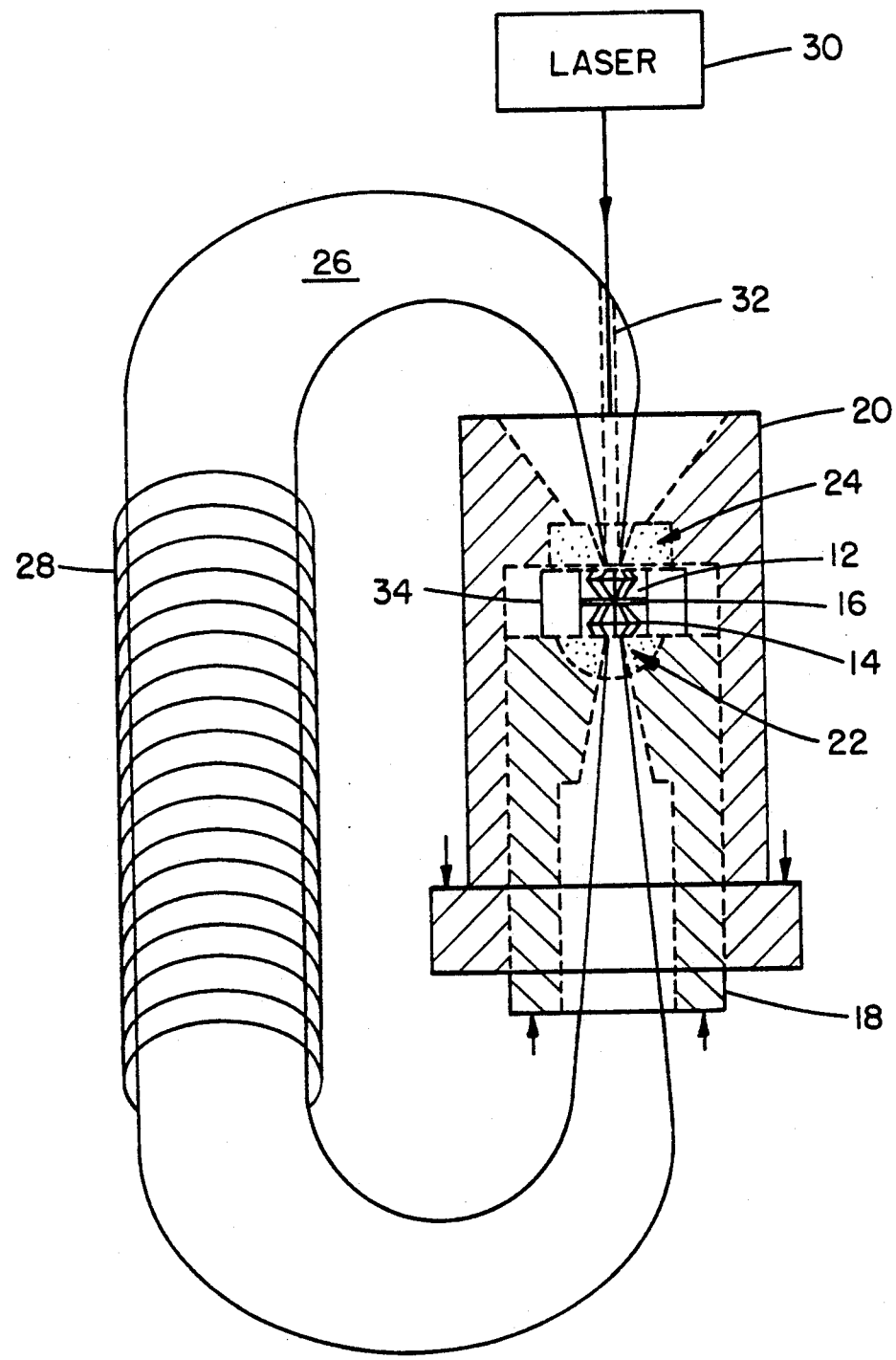

5,113,661

ENERGY STORAGE ARRANGEMENT

BACKGROUND OF THE INVENTION

1. Field of the Invention

The present invention relates generally to a method and system of energy storage in which energy is stored in the compression of a cryogenic metastable degenerate Fermi electron gas contained in a compressed metallic material, such as metallic hydrogen and/or metallic lithium, in a diamond anvil high pressure cell which is subjected to a magnetic field to further compress the metastable degenerate Fermi electron gas.

More particularly, during operation of the present invention, heat energy in the form of phonons is used to increase the energy of the compressed metastable degenerate Fermi electron gas. This increase in energy causes the metastable degenerate Fermi electron gas to increase its magnetic field which adds to and causes the overall magnetic field to increase. The increased magnetic field further compresses the metastable degenerate Fermi electron gas, which causes heat to be absorbed and results in a decrease in the temperature of the metastable degenerate Fermi electron gas. Energy can be withdrawn from the system by allowing the metastable degenerate Fermi electron gas to expand against the magnetic field.

SUMMARY OF THE INVENTION

Accordingly, it is a primary object of the present invention to provide a system and method for energy storage in which energy is stored by compression of a cryogenic metastable degenerate Fermi electron gas in the presence of a magnetic field.

In accordance with the teachings herein, the present invention provides an energy storage system and method as described in which a diamond anvil high pressure cell contains highly pressurized and cryogenic metallic hydrogen and/or lithium, of any isotope, containing a metastable degenerate Fermi electron gas. A magnetic field is applied to the degenerate Fermi electron gas in the diamond anvil high pressure cell to produce a further compression by magnetoconstriction of the metastable degenerate Fermi electron gas therein. The magnetic field, possibly in concert with an input laser beam, causes the degenerate Fermi electron gas to enter a metastable state, as is required for operation of the present invention. Phonons or heat waves introduced into the metastable degenerate Fermi electron gas cause an increase in the magnetic field associated with the metastable degenerate Fermi electron gas, which adds to and increases the overall magnetic field, which further compresses the metastable degenerate Fermi electron gas. The applied magnetic field can be generated by superconducting coils and/or standard coils coupled in a magnetic circuit with the diamond anvil high pressure cell. Phonons or heat waves introduced into the metastable degenerate Fermi electron gas can be converted to electromagnetic energy by the magnetic circuit by the increased current in the coils of the magnetic circuit which could be utilized to drive an electrical load coupled in series or parallel therewith.

The energy storage arrangement of the present invention can also be used for refrigeration in which mode heat energy is absorbed by further compression of the metastable degenerate Fermi electron gas, or by an increase in the magnetic field compressing the metastable degenerate Fermi electron gas.

In one preferred embodiment, a laser is used to direct a laser beam through the diamond anvil high pressure cell to vaporize the metallic hydrogen and/or lithium therein to form the metastable degenerate Fermi electron gas from the degenerate Fermi electron gas.

BRIEF DESCRIPTION OF THE DRAWINGS

The foregoing objects and advantages of the present invention for an energy storage arrangement may be more readily understood by one skilled in the art with reference being had to the following detailed description of several preferred embodiments thereof, taken in conjunction with the accompanying drawing which illustrates a cross sectional view of the basic structure of a Mao-Bell diamond anvil cell, showing the basic arrangement of a long cylinder-piston assembly with anvil diamonds set in carbide half cylinders, and also illustrates the diamond anvil cell in a magnetic circuit and with a laser to initiate a metastable state of a degenerate Fermi electron gas in the diamond anvil cell.

DETAILED DESCRIPTION OF THE DRAWINGS

Referring to the FIGURE, a diamond anvil arrangement 10 as used in one embodiment of the present invention includes an upper cut diamond 12 and a lower cut diamond 14, with a metal sample gasket 16 positioned therebetween which defines a cylindrical sample chamber therein. The ultra high pressure within the diamond anvil arrangement is created by a hardened steel piston 18 positioned within a hardened steel cylinder 20. A tungsten carbide half cylinder 2 is positioned between the piston 18 and the lower diamond 14, while a boron carbide half cylinder 24 is positioned between the cylinder 20 and the upper diamond 12. A magnetic circuit through the diamond anvil sample chamber is formed by a ferromagnetic loop 26, having magnetic coils 28 therearound, which could be standard coils or superconducting coils. A laser 30 is positioned to direct a laser beam through a small aperture 32 in the ferromagnetic loop 26 into the cylindrical sample chamber to assist in forming a metastable state in the degenerate Fermi electron gas. A cryogenic cooling circuit 34, through which a suitable cryogenic cooling fluid such as nitrogen is circulated, is placed around the central diamond anvil chamber to supply cryogenic cooling therefor.

An energy storage arrangement pursuant to the subject invention preferably comprises a diamond anvil high pressure cell 10 as illustrated containing hydrogen and/or lithium, of any isotope. Initially, cryogenic liquid hydrogen and/or lithium is placed in the diamond anvil high pressure cell. The pressure in the diamond anvil cell is then increased until metallic hydrogen and/or metallic lithium is formed, which results in the formation of a degenerate Fermi electron gas in the solid hydrogen and/or lithium. The energy storage system is then cooled further to a cryogenic temperature below the temperature at which the Fermi statistics of the degenerate electron gas in the metallic hydrogen and/or metallic lithium predominate over the Bose statistics of the degenerate Fermi electron gas.

Fermi and Bose statistics and the similarities and distinctions therebetween are well recognized in the art, and a comprehensive discussion of Fermi and Bose distributions as applicable to the present invention can be found in STATISTICAL PHYSICS, 1980, by Landau and Lifshitz, Chapter 5, on Fermi and Bose Distributions.

Hydrogen is the simplest of all elements, and is a liquid when cooled to near absolute zero, and at still lower temperatures freezes solid. Physicists and theorists studying the atomic structure of hydrogen have predicted that under enormous pressure, hydrogen should become a metal, and could remain metallic even after the pressure is released.

The pressures required to create metallic hydrogen are very great, and metallic hydrogen may exist in nature only in such ultra high pressure regions as the mantle of Jupiter. To achieve such pressures, physicists at the Carnegie Institution of Washington in the late 1970's pioneered development of the high pressure diamond anvil cell, a hydraulic press that squeezes the faces of two gem quality diamonds together. Trapped by a metal gasket between the two diamonds, tiny samples of hydrogen or other gases are squeezed to pressures that recently reached a record 2.5 million times the pressure of the atmosphere.

Scientists have reported that hydrogen at this pressure demonstrates metallic features. Dr. Ho-Kwang Mao and Dr. Russel J. Hemley of the Carnegie Institution of Washington have stated that in recent experiments, as pressure increased to 2.5 million times atmospheric pressure, hydrogen remains transparent to visible light but begins to reflect infrared radiation, as a characteristic metal.

Dr. Isaac F. Silvera also reported that he had obtained similar results at Harvard University in the past several months, and that these experiments produced a crystalline form of hydrogen (called Hydrogen A) that appears to be a type of metal consisting of a crystal lattice of hydrogen molecules. Higher pressures would be needed to convert this into a lattice of hydrogen atoms rather than molecules, a substance that would more truly resemble a conventional metal.

Diamond anvil high pressure cells are well known in the art and are used in high pressure research with both high and low temperatures to study the physics of high pressure phenomena, including metal-semiconductor transitions, electronic transitions, phonons and high-pressure lattice dynamics, and phase transitions.

Although diamond is known to be the hardest substance known to man and is quite transparent to x-rays and light, its value for generation and containment of high pressure was not realized until 1950, when Lawson and Tang (1950) used a drilled three-carat single-crystal diamond (in a split-bomb configuration) with a miniature piston, for performing high-pressure x-ray diffraction studies. Since that initial introduction many different types of high pressure diamond anvil cells have been constructed and used in high pressure research.

The basic principle of the diamond anvil cell is very simple. A sample is placed between the flat parallel faces of two opposed diamond anvils, and is subjected to pressure when a force pushes the two opposed anvils together. Variations in the construction of diamond anvil cells arise from different ways in which the force-generating and the anvil-alignment mechanisms are designed. Accordingly, several different types of diamond anvil cells have evolved in the art.

One type of diamond anvil cell which appears to be suitable for use with the present invention is the diamond anvil cell developed by Mao and Bell at the Geophysical Laboratory in Washington, as illustrated in FIG. 1. This type of diamond anvil cell has Belleville spring-loaded lever-arm mechanisms for generating the thrust, not illustrated, and has a long (60-70 cm) detachable piston-cylinder assembly. The anvil centering and alignment are accomplished by translating and tilting two hardened steel (RC 60) or tungsten carbide rockers (half cylinders) in their troughs. The proportioned body and the lever-arm system facilitate generation of large forces, and the long piston-cylinder assembly combined with the tungsten carbide mounts ensures excellent alignment of the diamonds. Mao and Bell claim to have reached 1.7 Mbar with $\frac{1}{8}$ carat brilliant-cut diamond anvils, whose culet tips were ground flat or beveled in part to low angles, and pressure generated in a preindented work-hardened stainless-steel gasket.

Diamonds for a diamond anvil cell are usually selected from brilliant-cut gem stones. The culet is removed by grinding a flat, octagonal surface with an area of approximately 0.45 mm$^2$ (usually 0.7 mm from side to side of the octagon). The size of the diamond may vary from $\frac{1}{8}$ to $\frac{1}{2}$ carat and the anvil flat from 0.3 to 0.7 mm. Anvil flats similar in area and shape are normally used, although diamonds with dissimilar flats have also been employed (0.5-0.3 mm against 1.8 mm). The anvil flat is usually set parallel to the (100) or the (110) plane of the diamond. The octagonal surface opposite to the anvil flat, referred to as the table, has a diagonal distance of 3.5-4.5 mm (equal to an area of 8-12 mm$^2$) in larger diamonds and of about 2 mm in $\frac{1}{8}$ carat diamonds. The selection of diamonds and their size depend upon the type of diamond anvil cell and the nature of the investigation.

Art recognized classifications of different types of diamonds are based primarily upon optical quantities, and include:

| | |
|---|---|
| Type I diamond: | Contains nitrogen as an impurity in fairly substantial amounts (of the order of 0-1%,) and which appears to have segregated into small aggregates. Also contains platelets, associated with the nitrogen impurity, the exact structure of which is not known. Most natural diamonds are of this type. |
| Type Ib diamond: | Also contains nitrogen as an impurity but in dispersed substitutional form. Almost all synthetic diamonds are of this type. |
| Type IIa diamond: | Effectively free of nitrogen impurity. Very rare in nature, these diamonds have enhanced optical and thermal properties. |
| Type IIb diamond: | A very pure type of diamond which has semiconducting properties: generally blue in colour. Extremely rare in nature. Semiconducting properties can be imparted to synthetic crystals by the incorporation of boron. |

Type IIb diamonds appear to be particularly suitable for utilization in a diamond anvil cell as used in the present invention.

The cryogenic temperatures required for operation of the present invention are dependent upon several parameters, including the density of the metallic hydrogen and/or lithium and the strength of the magnetic field applied to the metallic hydrogen and/or lithium.

After compression by the diamond anvil cell and cooling to the necessary cryogenic temperature, a magnetic field is applied across the diamond anvil by the magnetic circuit to further compress the metallic hydrogen and/or lithium therein. The magnetic field is produced by superconducting and/or standard conducting coil(s) 28 with the magnetic circuit extending through the upper and lower diamonds of the diamond anvil high pressure cell. The base material metallic hydrogen and/or lithium is then compressed further by the diamond anvil high pressure cell. Heat is then introduced into the system to warm the degenerate Fermi electron gas slightly, which causes it to become metastable, possibly causing a separation of the metastable degenerate Fermi electron gas from the containment walls of the diamond anvil cell to form a less dense metastable degenerate Fermi electron gas, possibly as a less dense bubble. The magnetic field, in concert with the warming of the degenerate Fermi electron gas, causes a conversion thereof to a less dense metastable degenerate Fermi electron gas.

The metastable degenerate Fermi electron gas is formed as a less dense medium, possibly a bubble, possibly located at the center of the base material rather than as a toroidal bubble surrounding the base material. In one embodiment, the bubble of metastable degenerate Fermi electron gas can be formed with a laser beam from laser 30 directed through one of the diamonds which vaporizes the base material to form the bubble. With this approach, care must be taken not to heat the base material above the necessary cryogenic temperature.

The system is then substantially self maintaining at the cryogenic temperature as ambient heat absorbed by the system manifests itself as additional phonons in the metastable degenerate Fermi electron gas. The additional phonons introduced into the metastable degenerate Fermi electron gas cause an increase in the magnetic field associated with the metastable degenerate Fermi electron gas, which adds to and increases the overall magnetic field, which further compresses by magnetoconstriction the metastable degenerate Fermi electron gas. The increased magnetic field compresses the metastable degenerate Fermi electron gas, which does not heat up because of this compression but increases its degeneracy. The metastable state of this system is metastable within specific limits. There exists a maximum compression of the metastable degenerate Fermi electron gas for a given embodiment with a given quantity of metastable degenerate Fermi electron gas. This compression is related to the energy contained in the metastable degenerate Fermi electron gas. When the energy of the individual electrons in the gas begins to approach the rest mass energy of the electron (i.e. at relativistic energies), nuclear capture of the electrons prohibits further phonon absorption by the metastable degenerate Fermi electron gas. In Fermi gas statistics, the electron gas has a nonzero energy at absolute zero. Further, a metastable system has a half life associated therewith, and in different embodiments, this half life may be lengthened using lithium to dope or replace the hydrogen. While the doping of hydrogen with lithium or the complete use of lithium increases the stability of the metastable states described herein, it also has the effect of making the electron gas less compressible. This is a result of nonconduction band(s) electrons in lithium. Metallic lithium can be created more easily because of the shielding of the atomic nucleus by the two electrons of the inner atomic orbit. The two electrons of the inner atomic orbit also make metallic lithium more incompressible than metallic hydrogen.

In absorbing phonons, the temperature of the metastable degenerate Fermi electron gas decreases, and preferably is used as a heat sink for the superconducting and/or standard conducting coils 28, as well as any components of the system subject to resistive (impedance) heating. A cryogenic fluid in cooling circuit 34 is preferably used for cooling and for the conduction of heat to and from the system. Moreover, one operative energy storage system could be used as a heat sink to cool another energy storage system to its cryogenic operating temperature. In this capacity, the system of energy storage and recovery of the present invention is used as a refrigeration system.

Energy can be removed from the system by allowing the current in the superconducting and/or standard conducting coils 28 to pass through an external impedance. The external impedance can be in series with the superconducting and/or standard conducting coils, or could also be in parallel therewith. The external resistance associated with the coils controls the expansion or compression of the metastable degenerate Fermi electron gas. One advantage of a parallel external resistance is that it can be used to control the current and/or voltage in the coils.

The current produced by this embodiment is direct current. Therefore, it may be necessary to convert the direct current to an alternating current, or change the voltage or amperage before passing it through a power distribution network.

While several embodiments and variations of the present invention for an energy storage arrangement are described in detail herein, it should be apparent that the disclosure and teachings of the present invention will suggest many alternative designs to those skilled in the art.

For instance, in alternative embodiments, the amount of energy that the system is able to store may possibly be increased by doping the base material with additional elements other than hydrogen or lithium which add additional electrons to the metastable degenerate Fermi electron gas to make it more incompressible.

Moreover, a suitable metastable degenerate Fermi electron gas may be formed in base materials other than hydrogen and/or lithium having the following properties:

(a) The base material must be metallic at the operating pressures of the system.

(b) The base material must be sufficiently compressible so that a metastable less dense region or bubble can be formed.

c) The base material must obey Fermi statistics at the cryogenic operating temperatures of the system, with the statistics being a result of the metastable degenerate Fermi electron gas.

What is claimed is:

1. A system for energy storage in which energy is stored by compression of a metastable degenerate Fermi electron gas subjected to a magnetic field, comprising a diamond anvil high pressure cell containing at very high pressures a metal having therein a metastable degenerate Fermi electron gas, and means for applying a magnetic field to the metastable degenerate Fermi electron gas in said diamond anvil high pressure cell to produce a compression of the metastable degenerate Fermi electron gas therein.

2. A system for energy storage as claimed in claim 1, wherein the metal comprises metallic hydrogen and/or lithium, of any isotope.

3. A system for energy storage as claimed in claim 1, wherein phonons or heat waves introduced into the metastable degenerate Fermi electron gas are converted to electromagnetic energy by increasing the magnetic field compressing the metastable degenerate Fermi electron gas.

4. A system for energy storage as claimed in claim 1, wherein said means for applying a magnetic field comprises magnetic coils coupled in a magnetic circuit with the diamond anvil high pressure cell.

5. A system for energy storage as claimed in claim 4, wherein phonons or heat waves introduced into the metastable degenerate Fermi electron gas are converted into electromagnetic energy by increasing the current or voltage in said magnetic coils.

6. A system for energy storage as claimed in claim 1, used for refrigeration in which heat is absorbed by compressing the metastable degenerate Fermi electron gas in said diamond anvil high pressure cell.

7. A system for energy storage as claimed in claim 1, further including a laser for directing a laser beam through said diamond anvil high pressure cell to vaporize the metallic hydrogen and/or lithium therein to convert the degenerate Fermi electron gas therein to a metastable state.

8. A method for energy storage in which energy is stored by compression of a metastable degenerate Fermi electron gas subjected to a magnetic field, comprising subjecting a material to a very high pressure in a diamond anvil high pressure cell to form a metallic state of the material containing a metastable degenerate Fermi electron gas, and applying a magnetic field to the metastable degenerate Fermi electron gas to produce a compression of the metastable degenerate Fermi electron gas therein.

9. A method for energy storage as claimed in claim 8, wherein said step of subjecting comprises subjecting a material of hydrogen and/or lithium, of any isotope, to a very high pressure to form a metallic state of the material containing a metastable degenerate Fermi electron gas.

10. A method for energy storage as claimed in claim 8, further comprising introducing phonons or heat waves into the metastable degenerate Fermi electron gas which are converted to electromagnetic energy by increasing the magnetic field compressing the metastable degenerate Fermi electron gas.

11. A method for energy storage as claimed in claim 8, used for refrigeration by absorbing heat by compressing the metastable degenerate Fermi electron gas.

12. A method for energy storage as claimed in claim 8, further including directing a laser beam at the material in its metallic state to convert the degenerate Fermi electron gas therein to a metastable state.

* * * * *